INVENTOR
NILS O. ROSAEN

Feb. 4, 1969     N. O. ROSAEN     3,425,557
BACKWASH MEANS FOR DUAL FILTER ELEMENTS
Filed April 4, 1966                Sheet 4 of 4
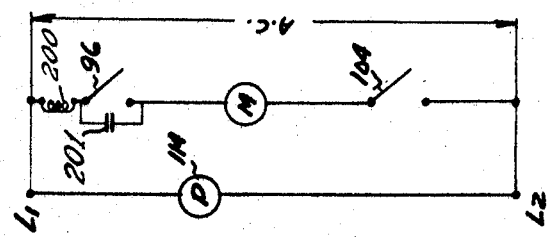
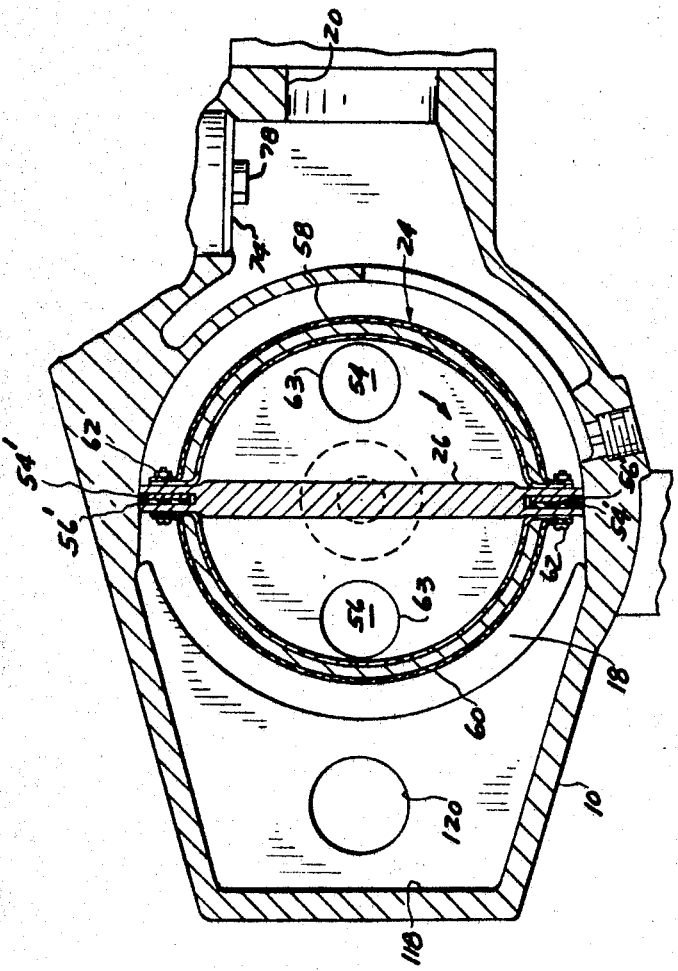
INVENTOR
NILS O. ROSAEN
BY Hauke, Kruse, & Gifford
ATTORNEYS United States Patent Office 3,425,557
Patented Feb. 4, 1969

3,425,557
BACKWASH MEANS FOR DUAL FILTER ELEMENTS
Nils O. Rosaen, Bloomfield Hills, Mich., assignor, by mesne assignments, to Universal Filters, Inc., Hazel Park, Mich., a corporation of Michigan
Filed Apr. 4, 1966, Ser. No. 539,863
U.S. Cl. 210—108
Int. Cl. B01d 23/24
9 Claims

ABSTRACT OF THE DISCLOSURE

A filter device suitable for substantially continuous operation including a cylindrical chamber, a filter element carrier and partition structure rotatably mounted in the chamber and carrying on its opposite sides vane members which, with the partition structure, divide the chamber into two fluidly separated sections, means connecting the first section with a fluid circuit directing fluid through the filter element to be filtered thereby and means for introducing a reverse flow of fluid through the filter element disposed within the other chamber section, and a system for automatically rotating the filter assembly to change the elements disposed in each of the sections upon the working filter element becoming clogged.

---

The present invention relates to a fluid filtering device having a plurality of filtering elements and more particularly to such a device having means for exchanging a clogged filter element with a clean filter element without diverting the normal fluid flow of the system, isolating the clogged filter from the fluid system, and dislodging and removing foreign matter from the isolated clogged element so that the cycle may be repeated.

Heretofore a number of filter devices have been provided which permit continued operation of the system even as the filter element is being removed for purposes of cleaning or replacement. Most of these, however, include some type of valve means that is operable upon being actuated to close off portions of the filter device and to redirect the fluid from the inlet to the outlet. Such valve means, in addition to adding considerable cost to the filter devices by reason of their considerable manufacturing costs, also are subject to malfunction. When the valve means become worn or when malfunction occurs, fluid continues to be drawn into the filter chamber as the filter element is removed, thus resulting in a substantial loss of system fluid and a difficult and time consuming clean-up operation. Furthermore, the system must be shut down while the valve means are repaired, thereby causing loss of time and money.

The present invention obviates the problems inherent in the conventional filter devices adapted for removal of the filter element during continued operation of the system by providing a housing having a cylindrical chamber and an inlet and an outlet provided on one side of the chamber. A filter carrier structure is rotatably mounted in the chamber and normally partitions the chamber into a first chamber section including the inlet and the outlet, and a second chamber section normally fluidly sealed from the first chamber section. The carrier structure also carries a pair of filter elements, one in each chamber section. Thus, the filter element in the first chamber section is disposed in an active filtering relationship in the system, while the filter in the second chamber is in a non-filtering disposition.

As the active filter element becomes clogged with foreign matter, it creates a pressure increase upstream of the filter chamber. When the pressure increases to a predetermined level, a pressure sensing means, which will be described in detail as the description proceeds, energizes a motor drivingly connected to a shaft rotatably connected to the filter carrier structure. The motor rotates the carrier structure to move the active filter out of filteing disposition in the system. The active and inactive filter elements are carried at diametrically opposite sides of the filter carrier structure. Cam means terminate rotation of the carrier structure after 180 degrees thereby exchanging the clogged filter with a clean filter without disturbing the normal fluid flow of the system.

A major feature of the present invention is structure for cleaning the clogged filter element after it has been removed from the normal fluid path of the system without undergoing the messy operation of removing the element from the filter housing. This structure includes a closed fluid pressure chamber communicating with the isloated filter element chamber section. A bladder disposed in the pressure chamber is operable by a sudden inflation from a source of pressurized air to create an abrupt increase in the fluid flow in the pressure chamber. This abrupt flow increase develops a fluid pressure wave that is transmitted to the clogged filter element in a direction opposite to the normal fluid flow through the filter element. This pressure wave is effective to dislodge the foreign matter from the element.

In order to remove the dislodged foreign matter from the isolated filter, a sump is fluidly connected to the chamber section containing the isolated filter element. A conduit from the first chamber section is fluidly connected to the isolated filter chamber section and delivers pressurized fluid for a predetermined time to carry the dislodged foreign matter to the sump. The isolated filter element is then ready to replace the active element.

It will be seen that the present invention eliminates the manual filter element exchanging required in maintaining conventional filter devices in operation by providing a device having a self-energized cycle including exchanging a clogged filter element with a clean filter element during continuous operation of the hydraulic system, and also including structure for automatically cleaning the clogged filter element without removal of the element from the filter housing.

It is therefore an object of the present invention to reduce the time in maintaining a clean filter device in a continuous fluid system by providing such a device having at least a pair of filter elements with the active element in filtering disposition with the fluid and the other inactive element isolated from the fluid and including self-energizing means responsive to the clogging of the active element to exchange the active clogged element with the inactive unclogged element.

It is another object of the present invention to eliminate the time in manually cleaning or replacing filter elements in a fluid system by providing a dual filter device having self actuating means for separating a clogged filter element from the fluid system to a chamber fluidly separated from the system, dislodging the foreign matter from the clogged element by introducing a reverse fluid flow through the element, and removing the dislodged foreign matter to a sump so that the element is in condition to be returned to the system.

It is still another object of the present invention to improve self-cleaning devices by providing an expansible member in a chamber in fluid communication with the filter chamber and operable upon a rapid inflation to create a sudden reverse flow through the clogged filter element disposed in the filter chamber.

It is a further object of the present invention to improve fluid filter devices by providing a construction for such devices which permits a clogged filter element to be removed from the fluid system without disrupting operation of the system through which the filter device is connected.

Still further objects and advantages of the present invention will readily occur to one skilled in the art to which the invention pertains upon reference to the following detailed description. The description makes reference to the accompanying drawings in which like reference characters refer to like parts throughout the several views and in which FIG. 1 is an elevational view of a filter device illustrating a preferred embodiment of the present invention with parts cut away for purposes of clarity;

FIG. 4 is a fragmentary sectional view as seen from line 4—4 of FIG. 2.

FIG. 7 is a schematic view of a preferred electrical system used in the invention.

Figure 1:
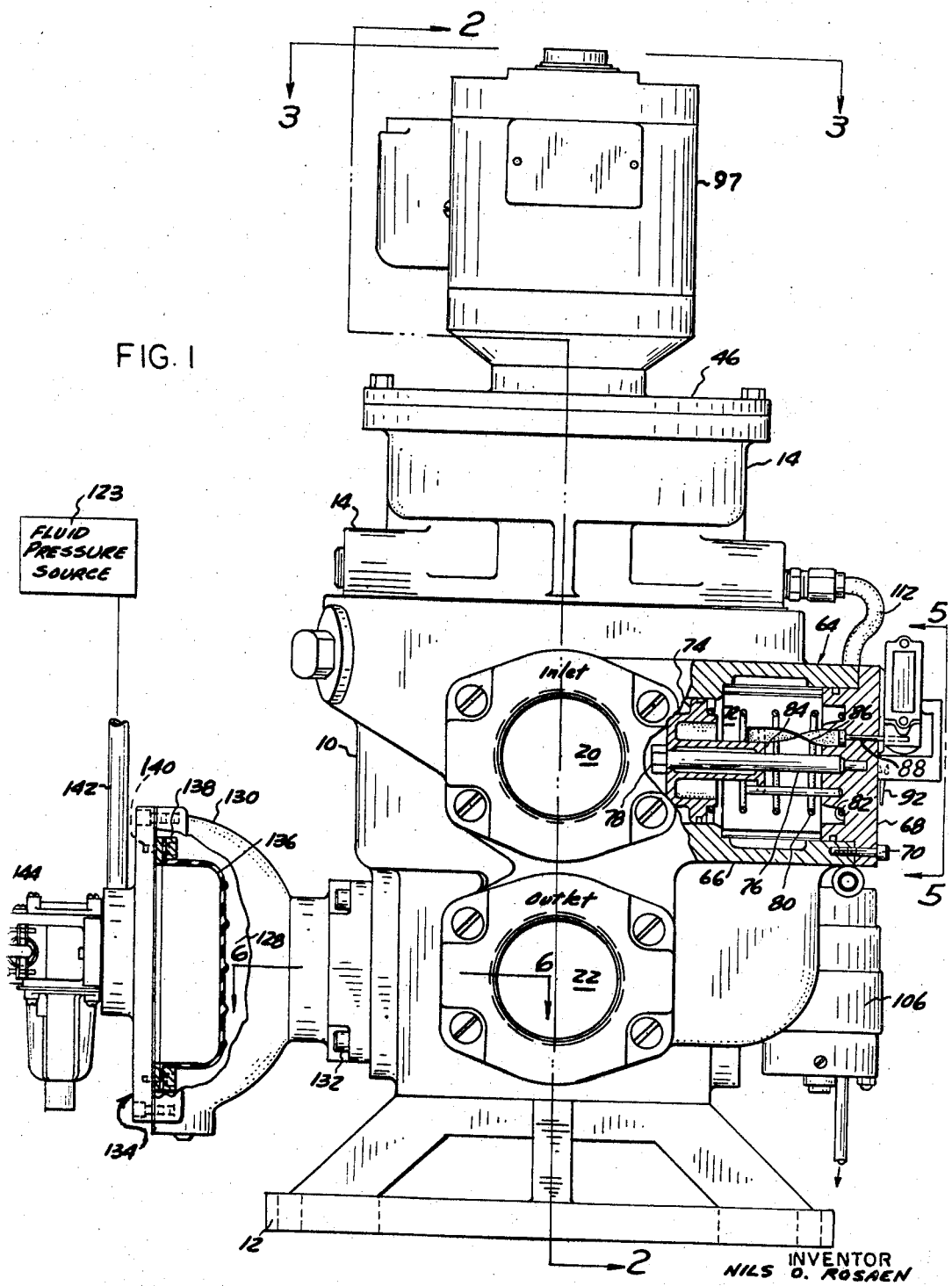
Figure 2:
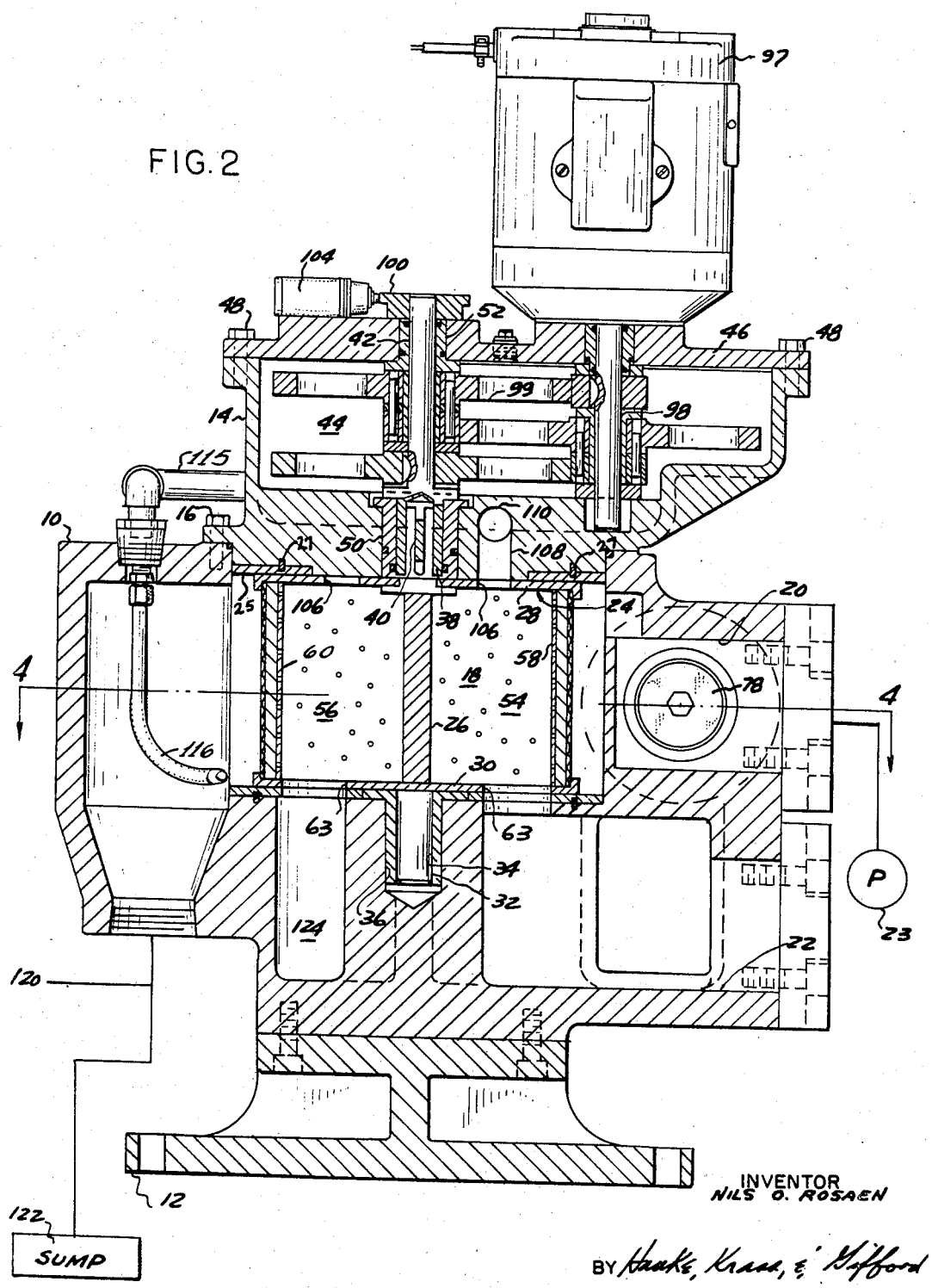
FIG. 2 is a sectional view as seen from line 2—2 of FIG. 1 and with portions of a preferred fluid system shown diagrammatically.

Now referring to the drawings, a preferred filter device is illustrated in FIGS. 1 and 2 as comprising a housing 10 supported on bracket 12. Housing 10 has a cap member 14 secured at its upper end by means of bolts 16 to define a substantially cylindrical filter chamber 18.

The housing 10 is provided with a fluid inlet 20 and a fluid outlet 22 both of which communicate with chamber 18. Preferably the inlet 20 is formed adjacent to and axially aligned with the outlet 22. A pump 23 is preferably connected to inlet 20.

A filter carrier structure generally indicated at 24 is rotatably mounted in chamber 18. As can best be seen in FIGS. 2 and 4, carrier structure 24 comprises an axially aligned partition plate 26 connected to an upper annular plate 28 and a lower annular plate 30 by screws (not shown). A floating annular plate 25 is mounted in the housing 10 and is resiliently urged by springs 27 into sealing contact with the plate 28. The plate 26 carries an axially aligned lower pin 32 which is journaled in a bushing 34 seated in a bore 36 formed in housing 10. An upwardly extending pin 38 is fixed to the upper edge of plate 26 axially aligned with pin 32 and connected by key member 40 to a drive shaft 42.

As can best be seen in FIG. 2, housing cap 14 defines a gear chamber 44 and is provided with closure plate 46 which covers the upper end of chamber 44 and is secured by means of bolts 48. Shaft 42 is journaled in a lower bushing 50 carried by the cap 14 and at its upper end in an upper bushing 52 provided in closure plate 46. Thus rotation of drive shaft 42, by means which will be described in detail, will rotate the carrier structure 24 in filter chamber 18.

Now referring to FIG. 4, the partition plate 26 has longitudinal slots 54' formed in diametrically opposite edges and in which are sandwiched seal or vane members 56'. Seal members 56' are adjusted so that they abut the wall of chamber 18 when the partition plate 26 is disposed normally to the inlet 20 and outlet 22 such that filter chamber 18 is divided into two fluidly separate chamber sections or subchambers consisting of a first chamber section or subchamber 54 and a second chamber section or subchamber 56. The first chamber section or subchamber 54 communicates with the inlet 20 and outlet 22. The second chamber section 56 is normally fluidly isolated from inlet 20 and outlet 22 by the seal members 56'.

The carrier structure 24 carries a first curvate filtering element 58 and a second curvate filter element 60 on opposite sides of partition plate 26 by means of threaded fasteners 62 as can best be seen in FIG. 4 and sandwiched between upper annular plate 28 and lower annular plate 30 as can best be seen in FIG. 4.

Fluid is pumped from a reservoir (not shown) by pump 23 through inlet 20 to the first chamber section 54 where it passes radially inwardly through filter element 58, then axially downwardly through an aperture 63 in lower annular plate 30 to exit through outlet 22 for delivery to a fluid user (not shown).

Now referring to FIG. 1, a pressure sensing device 64 is operatively connected to the fluid inlet 20 and comprises an extension 66 of housing 10 extending normally to inlet 20 and having a cover plate 68 fixed to the outer end thereof by bolts 70 to define a chamber 72. An annular member 74 is slidably and axially carried by an elongated rod 76 which is fixed at its outer end to cover plate 68. Annular member 74 is arranged so that its outer surface has a smooth sliding fit with the inner surface of the opening in housing extension 66 and with its movement toward inlet 20 restricted by a head 78 carried on the free end of rod 76.

A compression spring 80 is seated in an annular groove 82 provided on the inner face of cover plate 68 and abuts the inner face of annular member 74. Spring 80 is selected of a strength adequate to retain the member 74 in a position abutting the rod head 78 when filter element 58 is in a clean or unclogged condition. However, as the filter element 58 filters out foreign matter from the fluid and assumes a clogged condition, it will create an obstruction in the path of the fluid reducing the fluid velocity such that the inlet pressure will increase sufficiently to move annular member 74 axially inwardly against the force of spring 80. The member 74 has an inwardly directed pilot portion 84 which bears against an elongated twisted crank arm 86 carried on the inner end of a shaft 88. The outer end of shaft 88 is journalled in cover plate 68 and extends therethrough.

Figure 5:
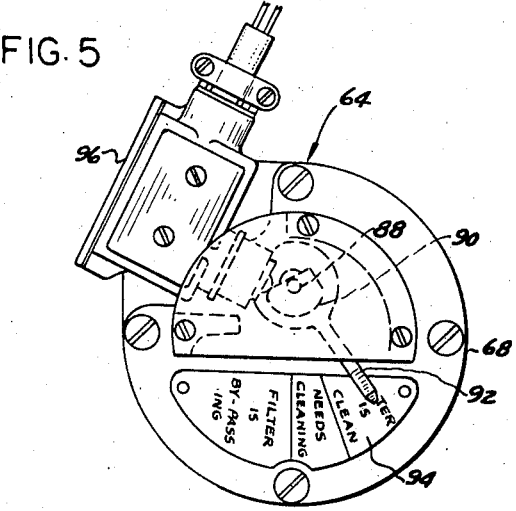
FIG. 5 is a fragmentary elevational view as seen from line 5—5 of FIG. 1.

As can best be seen in FIG. 5, shaft 88 carries on its outwardly extending end a cam 90 and a pointer 92. As the annular member 74 moves inwardly due to the increased inlet pressure caused by a clogged element, pilot portion 84 bears against crank arm 86 to rotate shaft 88 and cause pointer 92 to traverse a legend plate 94 carried on cover plate 68. The pointer 92 is adjusted to indicate the effective filtering condition of filter element 58.

A plunger type normally open switch 96 mounted on cover plate 68 is positioned such that as cam 90 rotates counterclockwise due to a clogged filter element, the switch 96 is actuated at a predetermined point to energize a motor 97 mounted on top of closure plate 46 as can be seen in FIG. 2. Motor 97 is drivingly connected to shaft 42 through motor output shaft 98 and speed reduction gears 99 disposed in gear chamber 44. Thus motor 97 when actuated by switch 96 will commence to rotate carrier structure 24.

Figure 3:
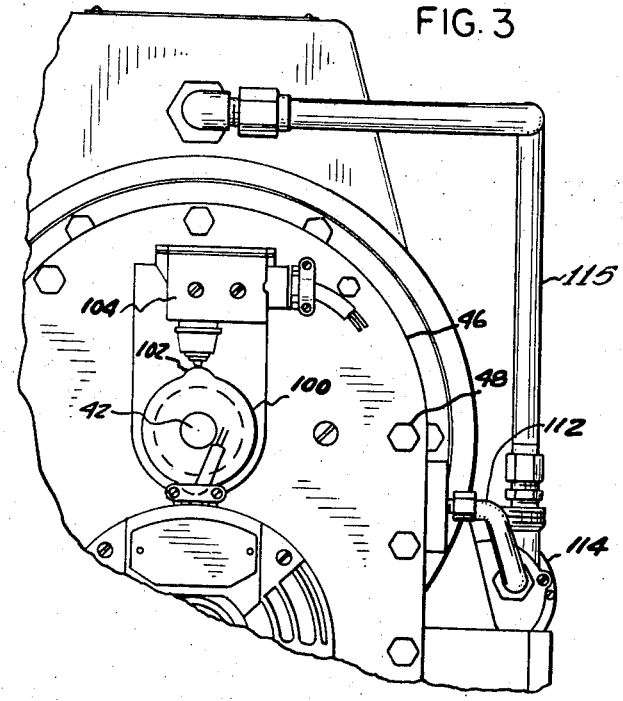
FIG. 3 is a partial top view as seen from line 3—3 of FIG. 2.

Now referring to FIGS. 2 and 3, rotation of carrier structure 24 moves the clogged filter element 58 out of chamber section 54 and filtering engagement with the fluid system, while the clean filter element 60 rotates from the isolated chamber section 56 into chamber section 54. A cam 100 carried on the upper end of drive shaft 42 has diametrically opposite lobes 102. A normally closed switch 104 is mounted on closure plate 46 in a position to be actuated upon rotation of the cam 100. The switch 104 is operative upon a 180 degree rotation of cam 100 and engagement with one of the cam lobes 102 to deenergize motor 97 and terminate rotation of the carrier structure 24. Thus a predetermined clogged condition of a filter element in the chamber section 54 will actuate means operative to exchange the clogged element with a clean element in the fluid system.

Referring now to FIG. 7 switches 96 and 104 are connected in series with the motor M and the coil 200 of the starter relay for the motor M. Normally open contacts 201 of the starter relay coil 200 shunt the switch 96. The normally open switch 96 is closed upon an increased pressure differential across the filter element 58 to energize the relay coil 200 and the motor M and lock in the contacts 201. As the carrier structure 24 begins to move, clean portions of the filter element 60 will be brought into the chamber section 54, the pressure differential will drop and the switch 106 will move again to the open position. The cam 100 will engage in the normally closed switch 104 to momentarily move it to an open position and to thus de-energize the motor M and the relay 200. As the motor, through intertia, moves the cam lobe 102 past the switch 104 so that it will again close, the circuit will remain open ready to begin the next cycle upon a buildup of pressure across the filter element 60.

Referring again to FIGS. 2 and 3, the upper annular plate 28 of the carrier structure has apertures 106 which register with a passage 108 which extends upwardly from chamber section 54 and in cap member 14. Passage 108 terminates with a transversely extending passage 110 which fluidly connects chamber section 54 with conduit 112. An electrically powered pump 114 fixed to housing 10 is connected to conduit 112 and is operative to draw fluid from chamber section 54 and deliver this fluid through a conduit 115 to a nozzle 116. Nozzle 116 is disposed in a chamber 118 provided in housing 10 adjacent to and communicating with the chamber section 56.

The discharge end of nozzle 116 is curved as shown to introduce the fluid in an impinging relationship against a clogged filter element as it rotates into chamber section 56. The impinging fluid assists in dislodging foreign matter from the filter element. Much of the fluid from the nozzle 116 as well as the foreign matter dislodged thereby is then discharged from chamber 118 through a conduit 120 fluidly connected to the bottom of the chamber and having outlet to a sump 122.

Figure 6:
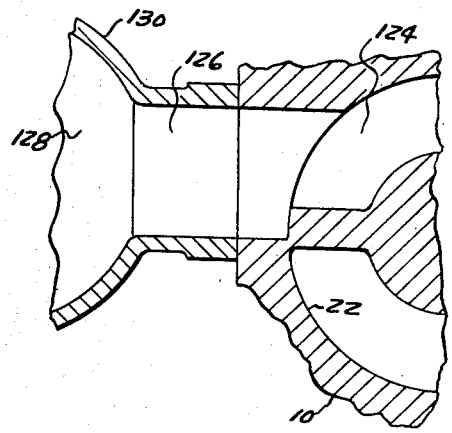
FIG. 6 is a view as seen from line 6—6 of FIG. 1.

Now referring to FIGS. 1, 2 and 6, an arcuate chamber 124 is provided in housing 10 immediately below chamber 56 and is fluidly connected by a passage 126 to a hemispherically shaped pressure chamber 128 defined by a housing 130 connected to housing 10 by threaded fasteners 132. The outer end of housing 130 is capped with a cover plate 134 having an expansible bladder 136, preferably fabricated of rubber, fixed, to its inner surface by an annular ring 138 and bolts 140 such that the interior of the bladder 136 is fluidly sealed from chamber 128.

A conduit 142 connected to a source of pressurized air 123 cooperates with a normally closed solenoid actuated valve 144, upon receipt of a signal from switch 104 through a suitable circuit (not shown) to deliver a sudden surge of air to the bladder 136. As bladder 136 suddenly expands, it transmits a surge of fluid pressure radially outward through the clogged filter element 60. This reverse flow through the filter element is effective to dislodge any remaining foreign matter retained by the filter and this dislodged foreign matter will of course be carried to the sump 122 with the aid of the fluid continuously discharging from the nozzle 116. The filter element in chamber 56 is then in a condition to be returned to chamber 54 when the cycle is repeated.

It will be seen from the foregoing that there has been described in detail an improved filter device having self-energizing means for replacing a clogged filter element with a clean filter element, fluidly isolating the clogged filter from the fluid system, and including means for cleaning the clogged filter so that the cycle may be repeated upon receipt of a signal from pressure responsive means actuated by the filter having clogged to a predetermined condition. Thus the filter device emodying the present invention not only eliminates the requirement for an attendant having to maintain a continued watch on the condition of the filter, but it also eliminates shutting down the hydraulic system and removing a dirty cartridge from the filter housing.

It is to be understood that we have described a dual filter element device for purposes of illustration only. A multi-element device having a carrier structure adapted to partition the filter chamber into a plurality of sections and provided with a suitable indexing means for exchaging one or more elements upon receipt of a suitable signal would clearly come within the scope of the present invention.

It is to be further understood that although the pump 114 has been described as delivering a continuous fluid discharge to the nozzle 116, the pump 114 could be adapted to deliver pressurized fluid from another source or only at selected intervals. The advantage of drawing fluid from the upper portion of chamber section 54 is that air which might become trapped therein can be withdrawn from the system.

Although I have described only one preferred embodiment of my invention, it will be apparent to anyone skilled in the art to which the invention pertains that various changes and modifications may be made therein without departing from the spirit of the invention or the scope of the appended claims.

I claim:

1. A filter device for separating foreign matter from a moving fluid medium comprising, housing means providing a fluid chamber and having sidewalls froming a portion of a cylinder, said housing having an inlet for receiving fluid to be filtered and an outlet for filtered fluid each fluidly connected with said filter chamber, a carrier structure and means rotatably mounting said carrier structure in said fluid chamber for rotation between operative positions about the axis of the cylinder defined by said sidewalls, partition structure carried by said carrier structure and including resilient vane members at opposite ends of the partition structure and engaging the sidewalls of said fluid chamber at the operative positions of said carrier structure to subdivide said chamber into a plurality of subchambers including a first subchamber fluidly connecting the inlet and the outlet of said housing means and a second subchamber normally fluidly separated from said first subchamber and from said inlet and said outlet, a plurality of similarly shaped filter elements mounted on said carrier structure, each of said filter elements having a partially cylindrical shape so that said filter elements collectively form a substantially cylindrical filter means having an axis coinciding with the axis of rotation of said carrier structure, at least one of said filter elements being disposed in said first subchamber so that unfiltered fluid is delivered in a first radial direction throuh said filter element for the separation of foreign matter and a second of said filter elements being disposed in said second subchamber when said carrier structure is in an operative position, means operable upon being actuated to produce a backwash through the clogged filter element in said second subchamber in a radial direction opposite to said first radial direction to clean said clogged filter element.

2. A filter device as defined in claim 1 and in which said means for producing a backward through said filter element disposed in said second subchamber comprises a pressure chamber fluidly connecting to the outlet side of said second of said filter elements, an expansible member disposed in said pressure chamber, and means operable to inflate said expansible member so that fluid is forced by said expansible member to flow from the pressure chamber to the outlet side of said second filter element.

3. A filter device as defined in claim 1 and including an annular plate mounted in the housing and spring means resiliently urging the plate into engagement with the carrier structure.

4. A filter device as defined in claim 1, including
 (a) a nozzle having a discharge end spaced from said second filter element;
 (b) a fluid connection from said first subchamber intermediate said first filter element and said fluid outlet to said nozzle;

(c) a pump disposed in said fluid connection; and
(d) a sump fluidly connected to said second subchamber so that said pump can deliver fluid from said first subchamber to said nozzle under a pressure sufficient to dislodge foreign matter from said second filter and to deliver said foreign matter to said sump.

5. A filter device as defined in claim 1, including means for delivering fluid from the upper portion of said first subchamber and intermediate said first filter element and said outlet to said second subchamber effective to remove air entrapped in said first subchamber and foreign matter form said second filter element to a sump.

6. A filter device for separating foreign matter from a moving fluid comprising, a housing means providing a fluid filter chamber, said housing means having an inlet for receiving the fluid to be filtered and an outlet for filtered fluid, said inlet and said outlet communicating with said filter chamber, partition structure and means rotatably mounting said partition structure in said filter chamber, said partition structure at one operative position subdividing said filter chamber into a first subchamber and a second subchamber, said first subchamber being in fluid communication with said inlet and said outlet and said second subchamber being separated from normal fluid flow from said inlet and said outlet by said partition structure, a first and a second filter element mounted on opposite sides of said partition structure, one of said filter elements being disposed in said first subchamber and the other of said filter elements being disposed in said second subchamber when said partition structure is in one operative position so that the fluid being received through said inlet passes through the filter element and said first subchamber in a first direction so that foreign matter in said fluid is collected by the filter element in said first subchamber, presssure chamber means fluidly connected with said second subchamber, surge producing means in said pressure chamber operable upon being actuated to produce a fluid surge in a reverse direction through the filter element disposed in said second subchamber so as to dislodge foreign matter from the filter element in said second subchamber, means for rotating said partition structure between operative positions when the filter element in said first subchamber assumes a clogged condition so that the filter element in said first subchamber is rotated into said second subchamber and the filter element in said second subchamber is rotated into said first subchamber, and means responsive to the change in operative positions of said partition structure to actuate said surge producing means to clean the filter element disposed within said second subchamber.

7. A filter device as defined in claim 6 and in which said surge producing means comprises an expansible bladder disposed in said pressure chamber and operable upon expansion to produce a surge of fluid from said pressure chamber and into said second subchamber.

8. A filter device as defined in claim 6 and including means for delivering filter fluid from said first subchamber and into said second subchamber and said pressure chamber, the filter element in said second subchamber being submerged in said filtered fluid, and including an expansible bladder disposed in said pressure chamber and having one side exposed to said filtered fluid and means for rapidly inflating said bladder so that said bladder produces a pressure surge in said filter fluid from said pressure chamber and into said second subchamber.

9. A self-cleaning filter device comprising housing means providing a fluid chamber and having sidewalls forming a portion of a cylinder said housing means having an inlet for receiving fluid to be filtered and an outlet for filtered fluid each fluidly connected with said filter chamber, a carrier structure and means rotatably mounting said carrier structure in said fluid chamber for rotation between operative positions about the axis of the cylinder defined by said sidewalls, partition means carried by said carrier structure and including vane members engageable with the sidewalls of said fluid structure at the operative positions of said carrier structure to subdivide said chamber into a plurality of subchambers including a first subchamber fluidly connecting the inlet and the outlet of said housing means and a second subchamber normally fluidly separated from said first subchamber and from said inlet and said outlet, a plurality of similarly shaped filter elements mounted on said carrier structure, each of said filter elements having a partially cylindrical shape so that said filter elements collectively form a substantially cylindrical filter means having an axis coinciding with the axis of rotation of said carrier structure, at least one of said filter elements being disposed in said first subchamber so that unfiltered fluid is delivered in a first radial direction through said filter element for the separation of foreign matter and a second of said filter elements being disposed in said second subchamber when said carrier structure is in an operative position, pressure responsive means sensing the condition of the filter element in said first subchamber and being operative to produce a signal upon sensing that said first filter element is clogged to a predetermined degree, means responsive to the signal from said pressure responsive means for moving said carrier structure from the first to a second operative position in which the clogged filter element in said first subchamber is rotated into said second subchamber and the filter element in said second subchamber is rotated into said first subchamber, and means for producing a backwash through the clogged filter element in said second subchamber in a radial direction opposite to said first radial direction to clean said clogged filter element.

References Cited

UNITED STATES PATENTS

| | | | |
|---|---|---|---|
| 416,076 | 11/1889 | Rieck | 210—412 |
| 550,583 | 12/1895 | Brinckman et al. | 210—409 |
| 968,822 | 8/1910 | Weinland | 210—324 |
| 1,638,545 | 8/1927 | Mueller et al. | 210—324 |
| 1,816,785 | 7/1931 | McGlaughlin | 210—333 X |
| 2,022,016 | 11/1935 | Wardle | 210—332 |
| 2,077,589 | 4/1937 | Seaver et al. | 210—333 X |
| 2,119,433 | 5/1938 | Haught | 210—106 |
| 2,184,177 | 12/1939 | Burrell | 210—107 |
| 2,310,587 | 2/1943 | MacNeill | 210—411 |
| 2,382,656 | 8/1945 | Obenshain et al. | 210—333 X |
| 2,540,134 | 2/1951 | Nelson | 210—412 X |
| 2,834,474 | 5/1958 | Jalkanen | 210—408 |
| 2,940,517 | 6/1960 | Skellern | 210—333 X |
| 3,074,556 | 1/1963 | Rosaen | 210—195 |
| 3,275,151 | 9/1966 | Carr | 210—333 |
| 3,074,556 | 1/1963 | Rosaen | 210—195 |

FOREIGN PATENTS

| | | |
|---|---|---|
| 630,051 | 10/1961 | Canada. |
| 511,891 | 8/1939 | Great Britain. |

REUBEN FRIEDMAN, *Primary Examiner.*

FRANK A. SPEAR, JR., *Assistant Examiner.*

U.S. Cl. X.R.

210—333, 408, 412